J. CHALMERS.
CLUTCH.
APPLICATION FILED FEB. 16, 1911.
1,046,440.
Patented Dec. 10, 1912.
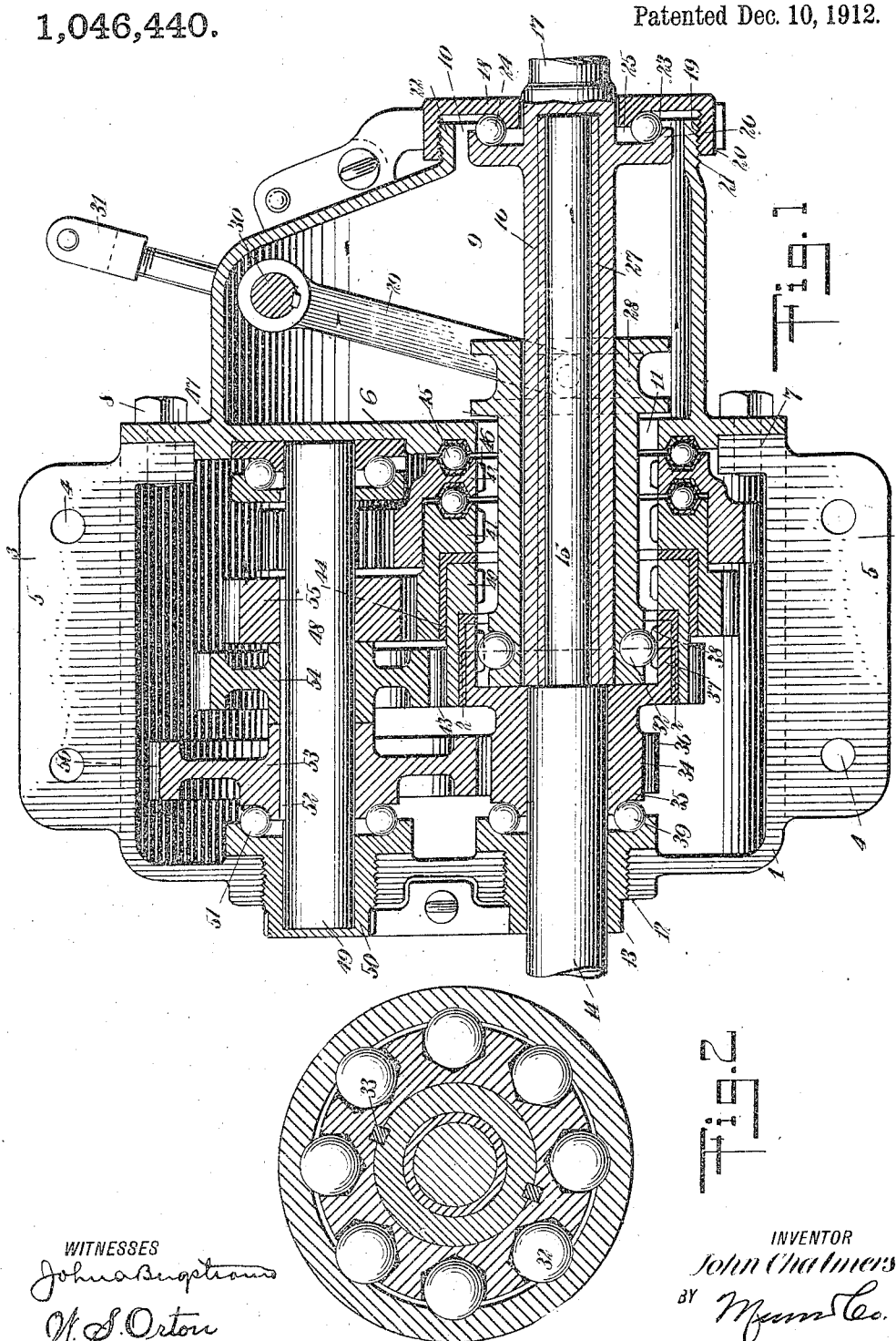
WITNESSES
INVENTOR
John Chalmers
BY
ATTORNEYS

UNITED STATES PATENT OFFICE.

JOHN CHALMERS, OF BATH, MAINE.

CLUTCH.

1,046,440.

Specification of Letters Patent. Patented Dec. 10, 1912.

Application filed February 16, 1911. Serial No. 608,958.

*To all whom it may concern:*

Be it known that I, JOHN CHALMERS, a subject of the King of Great Britain and Ireland, and a resident of Bath, in the county of Sagadahoc and State of Maine, have invented a new and Improved Clutch, of which the following is a full, clear, and exact description.

My invention relates in general to a clutch connection between a driving and a driven member, in which means are provided for connecting the driven with the driving means, so that motion is transmitted from one to the other of said members.

The invention relates more particularly to the clutch mechanism in that class of transmission gearing in which the rotary motion is transmitted at different speeds through two sets of gears running on parallel axes, of which gears some are loose on one of the shafts and are provided with a clutch device for connecting them at will, so that the motion may be transmitted through any one of the gears desired, and consequently at speeds proportionate to the ratio of these transmitting gears.

The novel features of my invention reside especially in the peculiar construction and organization of the mechanisms for connecting the loose gears at will with the transmitting element coacting therewith.

An object of my invention is to provide a relatively compact assemblage of gears, all compactly mounted to coact with anti-friction devices, whereby the speed of the relative parts may be changed with a device which will occupy the least amount of space with the greatest effective use of material.

With the above and other objects in view, as will more fully hereinafter appear, the present invention consists in certain other novel details of construction and arrangement of parts hereinafter fully described, illustrated in the accompanying drawings, and more particularly pointed out in the appended claims.

Reference is to be had to the accompanying drawings, forming a part of this specification, in which similar characters of reference indicate corresponding parts in all the figures, and in which—

Figure 1 is a transverse sectional view taken longitudinally through a preferred embodiment of my device; and Fig. 2 is a transverse sectional view taken in a plane indicated by the line 2—2 at the lower central portion of Fig. 1.

The gear case 1 is cylindrical, and may be made in one piece, or in two semi-cylindrical halves 2 and 3, as shown in Fig. 3, and bolted together through the apertures 4 in projecting flanges 5. One end of the casing is closed by means of a head 6 fastened to the head flange 7 by rivets or bolts 8. This head 6 has an offset buttress 9 extending outwardly therefrom and terminates in an opening 10 in alinement with an opening 11 in the head of the casing. In alinement with and concentric with these two openings, is an internally-threaded aperture 12 on the back of the casing, into which fits a nipple 13 affording a bearing for the driving shaft 14 attached to the engine or other prime motor. This shaft 14 is reduced a short distance within the casing, to form a smaller shaft 15, about which latter shaft is telescoped the hollow extension 16 of the driven shaft 17, which driven shaft passes through a closure cap 18 having internal screw threads 19 on the flange 20 thereof and adapted to engage the threads 21 on the projecting rim 22 extending out from the buttress 9 and forming the outline of the opening 10. This cap 18 is slightly recessed, as shown at 23, a short distance from its center, into which recess fit the balls 24, which move in a raceway 25 formed by the L-shaped flange 26 integral with and extending outward from the inner portion of the hollow extension 16 of the driven shaft. Interposed between the smaller shaft 15 and the extension 16, is a sleeve packing 27 of Babbitt-metal or any similar substance. It will be seen that by this arrangement, the driving shaft revolves within the driven shaft without communicating its motion to the last-mentioned shaft.

Mounted to slide longitudinally upon the extension 16, is a clutch sleeve 28 actuated by a lever 29 keyed to a shaft 30 within the buttress 9 and having a controlling arm 31 exterior of the casing. The sleeve 28 is splined on the extension 16, as shown at 33, and near its end is a series of pockets circumferentially disposed about the periphery of the clutch, and in each of these pockets are positioned engaging spheres 32, for a purpose hereinafter described. The clutch may be made up with solid ribs or lugs instead of the spheres above described.

Rigidly mounted at the inner unreduced end of the driving shaft 14, is a gear wheel 34 having a reduced portion 35 upon which are mounted gear teeth 36, and having a hollow extension in the form of a flange. This flange has circumferentially disposed about its inner side, a series of projecting studs 38, which are adapted to be engaged by the spheres 32. It will be seen that by the connection shown in Fig. 1, motion is transmitted from the driving shaft through the gear 34, through the spheres 32, clutch sleeve 28 to the driven shaft 17, thereby making a direct connection between the driven and the driving shafts. In order to reduce friction between the gear 34 and the back of the casing, the nipple 13 is internally recessed and has anti-friction devices 39 similar to the arrangement described for the driven shaft on the opposite side of the device.

Concentrically and loosely mounted over and encircling the clutch sleeve 28, is a bank of gears 40, 41 and 42, each gear having a main portion directly mounted on the sleeve 28, and has a projecting rim extending over the next adjacent gear toward the rear of the casing, and each of the gears has projecting from this flanged portion gear teeth 43 varying in number, whereby relatively different speeds are obtained through connections with these successive gears. These gear members are separate one from the other, either by a packing of composition or Babbitt-metal 44, or by means of anti-friction devices 45 positioned between the sides of adjacent gear members and the side of the last gear member 42 and the inside of the head 6. The diameter of the bore of each of the gear members 40, 41 and 42 is somewhat larger than the diameter of the clutch 28, and projecting into this enlarged recess is a series of projecting lugs 46 extending inwardly from each of the aforementioned gears. It will be seen by this arrangement that the spheres carried by the clutch member may be moved successively into engagement with the lugs 46 on the gears 40, 41 and 42, thereby connecting these gears in succession with the driven shaft.

Positioned above the shafts 14 and 15 and having one end mounted to revolve in a socket 47 formed in the inner face of the head 6, is an auxiliary shaft 48, the outer end 49 of which is held in the rear of the casing by a nipple 50, similar in construction to the nipple 13, and having anti-friction devices 51 constructed similarly to the anti-friction devices 39 on the driving shaft. Rigidly fastened to the shaft 48 by means of a spline 52, are gear wheels 53, 54 and 55, of decreasing diameters in the order enumerated. The teeth 56 of the gear 53 intermesh with the teeth 36 of the gear 34, and in this way motion is continually transmitted from the driving shaft 14 to the auxiliary shaft 48, which in turn drives the gears 54 and 55. The teeth on the gear 54 are continually in mesh with the gear teeth 43 projecting from the gear 40, and the teeth on the gear 55 continually mesh with the teeth projecting from the gear 41.

It will be seen by this arrangement that when the clutch is drawn so that the spheres 32 engage with the lugs 46 of the gear 40, motion will be transmitted from the driving shaft 14 through the gears 34, 53, 54 and 40, and through the clutch 28 to the extension 16 of the driven shaft 17, with a relative change of speed dependent upon the ratio of the intermeshing gears.

While a preferred embodiment of the invention has been described, it is to be understood that many changes could be made in the above construction and many apparently widely different embodiments of this invention could be made without departing from the scope thereof. It is intended that all matters contained herein in the above description or shown in the accompanying drawings, shall be interpreted as illustrative and not in a limiting sense. It is also to be understood that the language used in the following claims is intended to cover the full scope of the invention and is not to be given any narrower construction than the prior art demands, and that materials, sizes and relativities of parts are non-essential, except as called for in the claims.

Having thus described my invention, I claim as new and desire to secure by Letters Patent:

1. The combination of axially alined driving and driven elements, a gear having a recess in the end thereof and having a series of studs projecting into said recess and rigidly fastened to the driving element, and a clutch member having a series of peripherally disposed pockets adjacent the end nearest the gear, and a sphere carried by and projecting from each of said pockets, said spheres adapted to engage said studs, whereby motion may be transmitted directly from said driving element to said clutch.

2. In a clutch mechanism, a driving shaft having a reduced portion, a driven shaft loosely mounted on said reduced portion, a clutch member slidably and non-rotatably mounted on said driven shaft, means carried by the enlarged portion of said driving shaft, said means having a drum projecting over said reduced portion and over a part of said clutch member, and means within said drum adapted to be engaged by said clutch member, whereby a direct connection is made between said driven shaft and said driving shaft through said clutch member, and a yoke lever rotatably engaging said clutch member beyond said drum, to actuate said member on the rotating driven shaft.

3. In a clutch mechanism, a driven element, a cylindrical clutch member splined to and slidably mounted upon said driven element, means for sliding said clutch member longitudinally on said driven element, a series of spheres mounted about the periphery of said clutch member, and a driving member provided with means disposed parallel with the line of movement of said clutch member and adapted to engage said clutch member through said spheres.

4. A rotating clutch member, comprising a relatively long cylindrical member, both ends of which are of increased diameter, one end having a peripheral groove therein adapted to receive the yoke of an actuating lever, the other enlarged end having a series of peripherally-disposed pockets, and a gear engaging sphere carried by each of said pockets and means adapted to be engaged by said spheres.

In testimony whereof I have signed my name to this specification in the presence of two subscribing witnesses.

JOHN CHALMERS.

Witnesses:
  WILLIAM BOYD,
  ALLAN A. McDONALD.